(12) United States Patent
Bole

(10) Patent No.: US 12,457,401 B2
(45) Date of Patent: Oct. 28, 2025

(54) DEVICE FOR OBSERVING A PASSENGER COMPARTMENT OF A VEHICLE

(71) Applicant: VALEO COMFORT AND DRIVING ASSISTANCE, Créteil (FR)

(72) Inventor: Samuel Bole, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 18/722,301

(22) PCT Filed: Dec. 12, 2022

(86) PCT No.: PCT/EP2022/085395
§ 371 (c)(1),
(2) Date: Jun. 20, 2024

(87) PCT Pub. No.: WO2023/117542
PCT Pub. Date: Jun. 29, 2023

(65) Prior Publication Data
US 2025/0063244 A1    Feb. 20, 2025

(30) Foreign Application Priority Data
Dec. 20, 2021  (FR) ..................... 2113961

(51) Int. Cl.
*H04N 23/00*  (2023.01)
*B60Q 3/74*  (2017.01)
*H04N 23/56*  (2023.01)

(52) U.S. Cl.
CPC ............... *H04N 23/56* (2023.01); *B60Q 3/74* (2017.02)

(58) Field of Classification Search
CPC .................... H04N 23/56; B60Q 3/74
See application file for complete search history.

(56) References Cited

U.S. PATENT DOCUMENTS 5,993,015 A    11/1999  Fredricks
6,198,409 B1 *  3/2001  Schofield ............. B60R 1/12
340/436

(Continued)

FOREIGN PATENT DOCUMENTS

JP    2012005054 A    1/2012

OTHER PUBLICATIONS

International Search Report Issued in Corresponding PCT Application No. PCT/EP2022/085395, dated Mar. 15, 2023. (5 Pages with English Translation).

(Continued)

*Primary Examiner* — Frank F Huang
(74) *Attorney, Agent, or Firm* — Osha Bergman Watanabe & Burton LLP

(57) ABSTRACT

A device for observing a passenger compartment of a vehicle is disclosed. The observing device includes a camera configured to acquire images of the passenger compartment, a primary luminous module, and a secondary luminous module. The primary luminous module has a primary illumination field configured to illuminate at least one passenger area. The secondary luminous module has a secondary illumination field narrower than the primary illumination field of the primary luminous module and configured to illuminate a primary driver are of the vehicle.

15 Claims, 5 Drawing Sheets

(56) References Cited

U.S. PATENT DOCUMENTS

| | | | | |
|---|---|---|---|---|
| 6,392,315 | B1* | 5/2002 | Jones | F02P 17/12 |
| | | | | 307/10.6 |
| 6,720,920 | B2* | 4/2004 | Breed | G01S 13/931 |
| | | | | 342/357.31 |
| 7,079,017 | B2* | 7/2006 | Lang | G01S 15/931 |
| | | | | 340/436 |
| 7,579,940 | B2* | 8/2009 | Schofield | G02B 27/0101 |
| | | | | 701/487 |
| 2002/0167589 | A1* | 11/2002 | Schofield | B60R 1/26 |
| | | | | 348/E7.086 |
| 2005/0134983 | A1* | 6/2005 | Lynam | B60R 1/12 |
| | | | | 359/872 |
| 2007/0073473 | A1* | 3/2007 | Altan | G01S 13/862 |
| | | | | 701/518 |
| 2007/0181810 | A1* | 8/2007 | Tan | G01S 7/4811 |
| | | | | 250/341.1 |
| 2010/0139995 | A1* | 6/2010 | Rudakevych | B62D 55/06 |
| | | | | 180/9.32 |
| 2011/0063445 | A1* | 3/2011 | Chew | G06V 20/52 |
| | | | | 348/E7.085 |
| 2021/0103748 | A1 | 4/2021 | Nakamura | |

OTHER PUBLICATIONS

Written Opinion of the International Research Administration issued in Corresponding PCT Application No. PCT/EP2022/085395, dated Mar. 15, 2023. (6 Pages).

* cited by examiner

[Fig. 1]
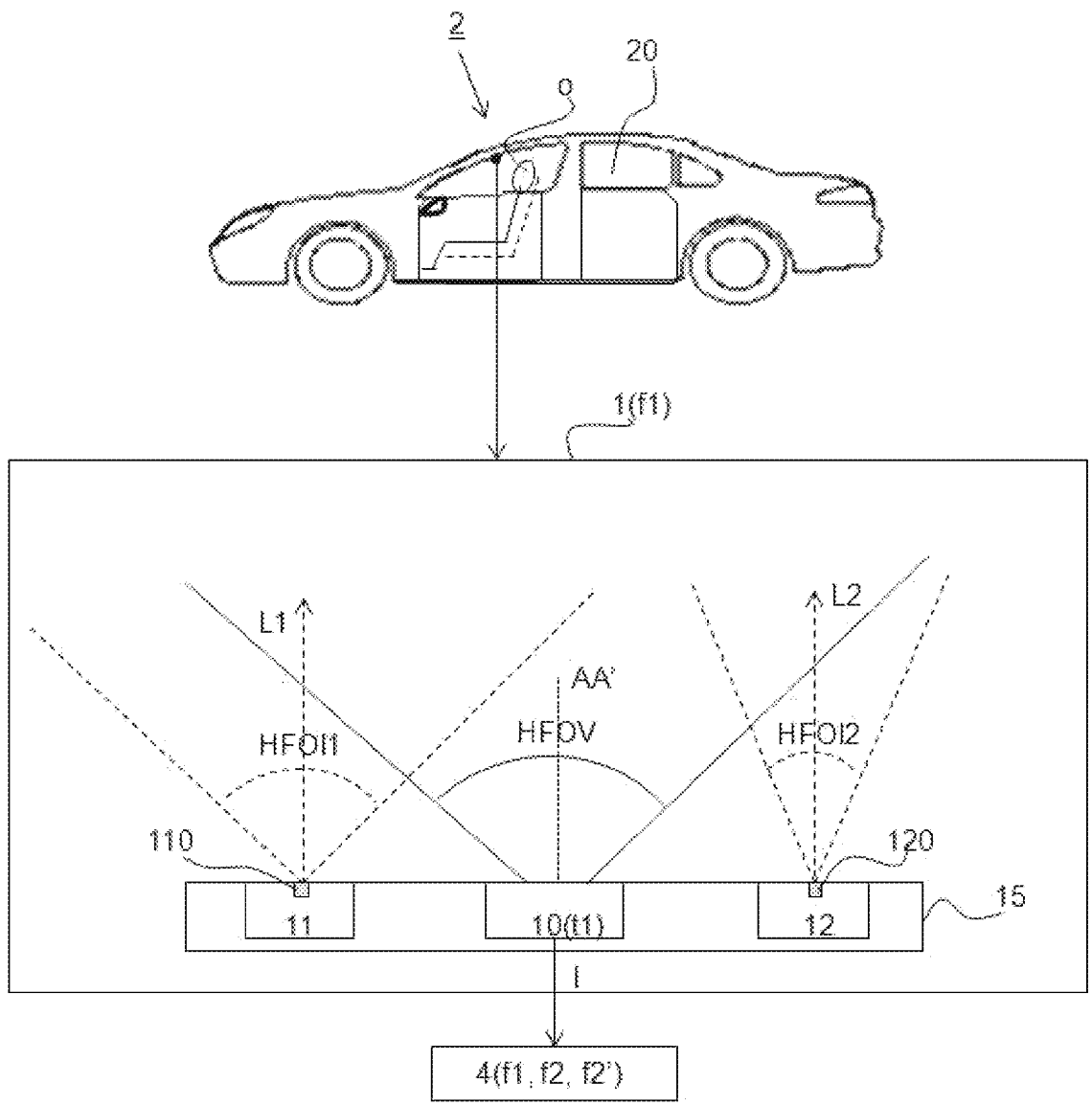

[Fig. 2]
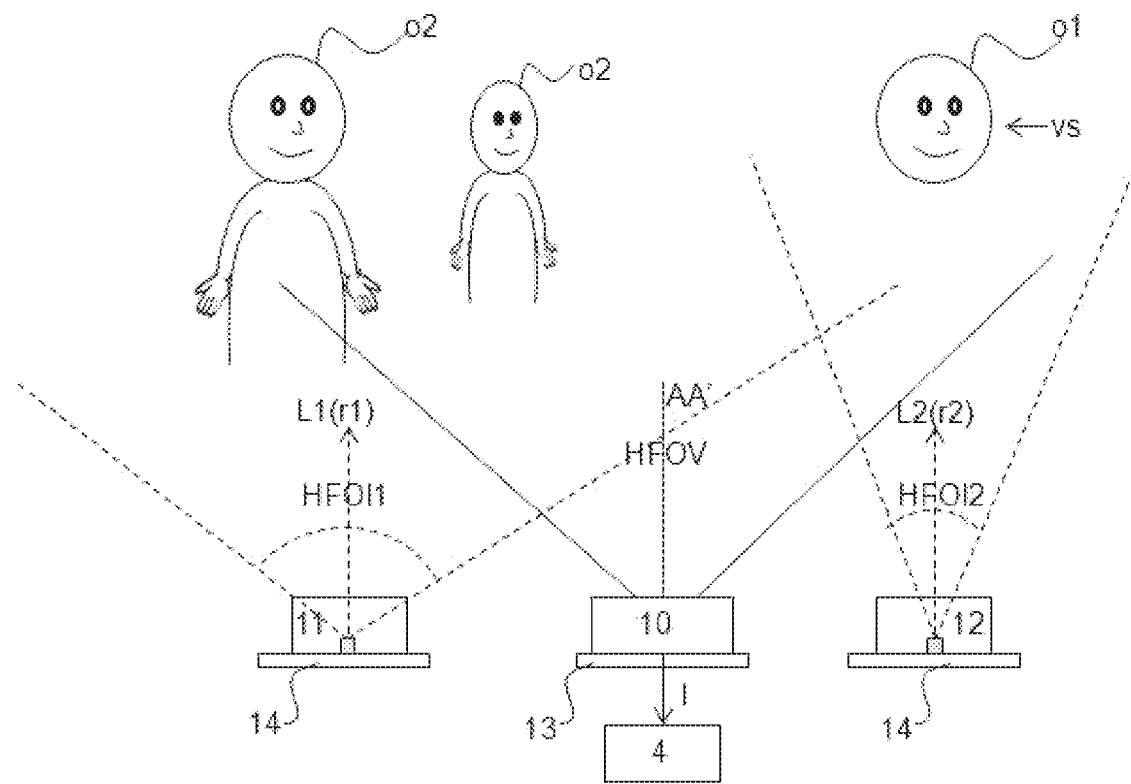
[Fig. 3]
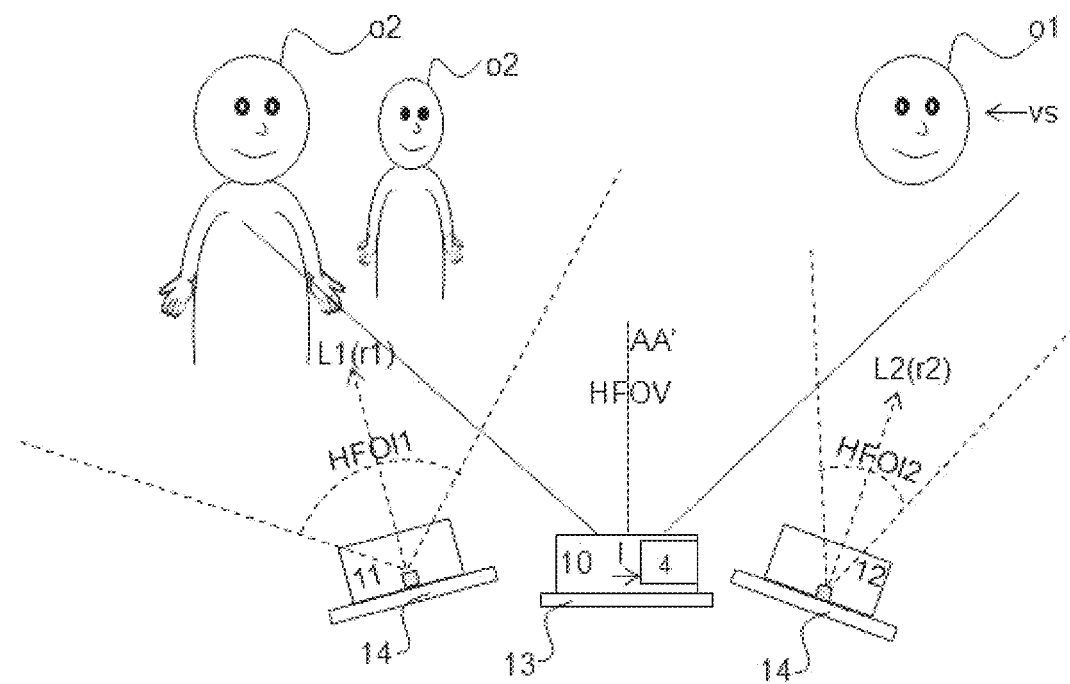

[Fig. 4]
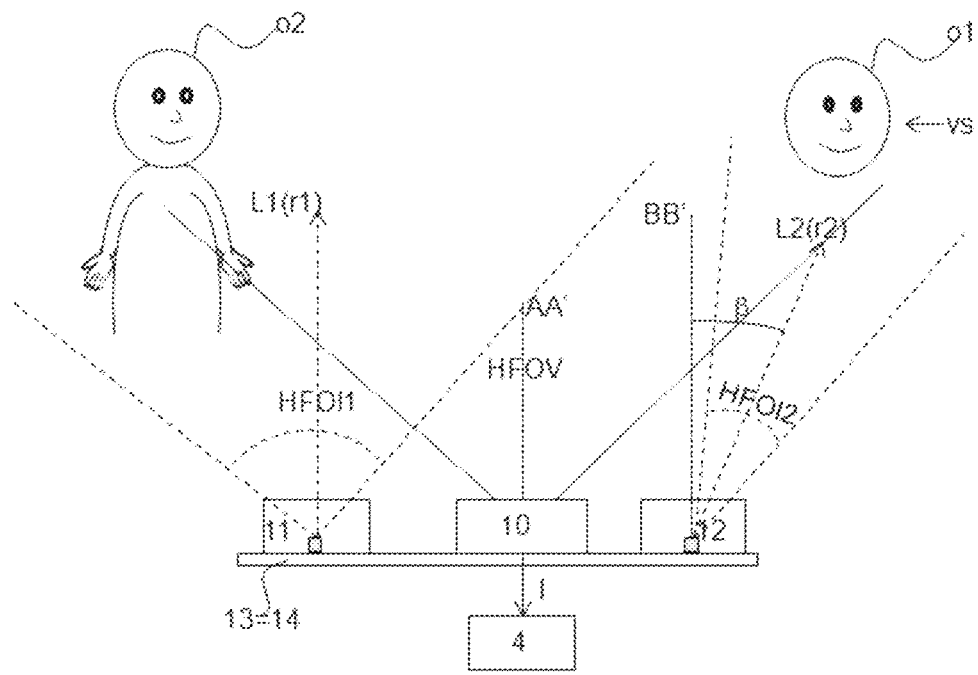
[Fig. 5]
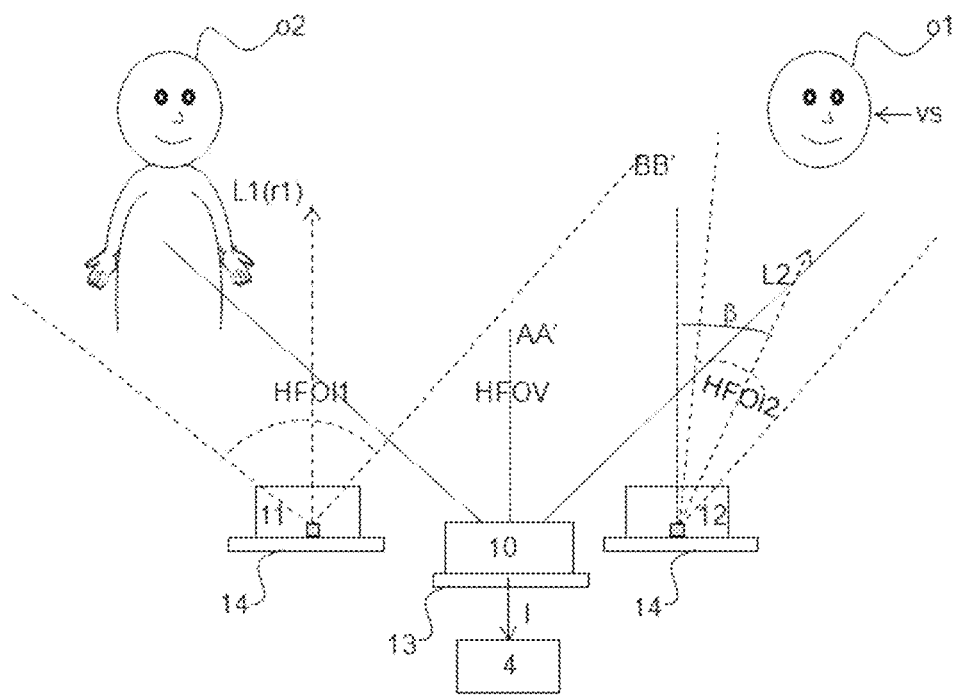

[Fig. 6]
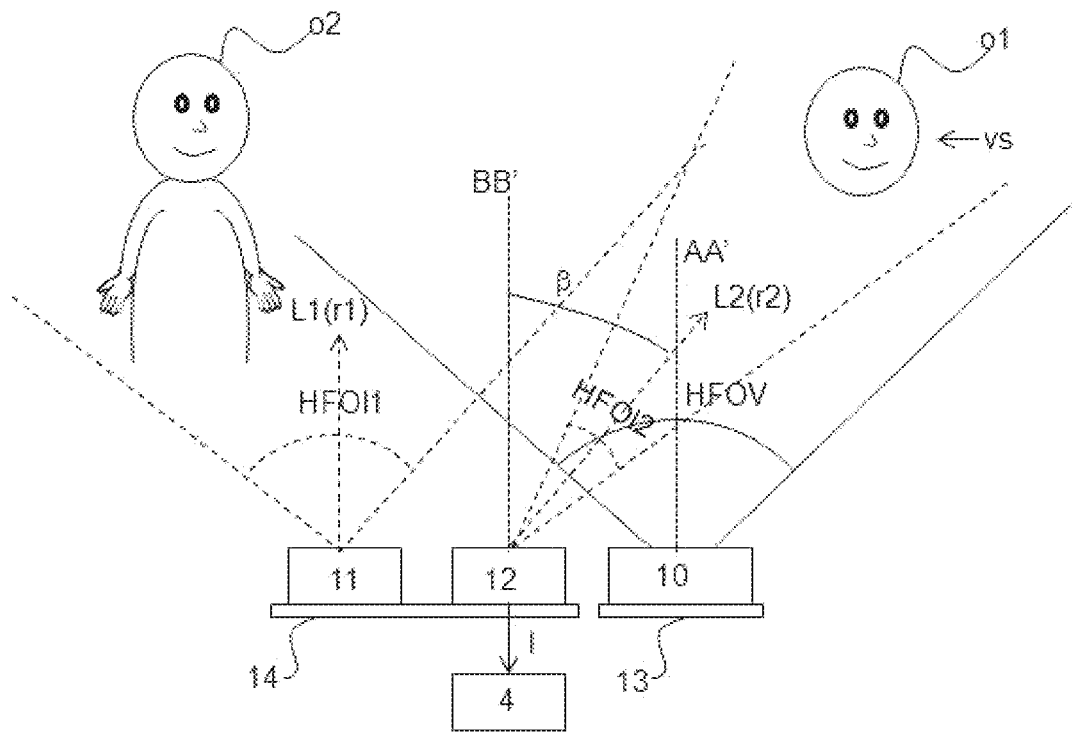
[Fig. 7]
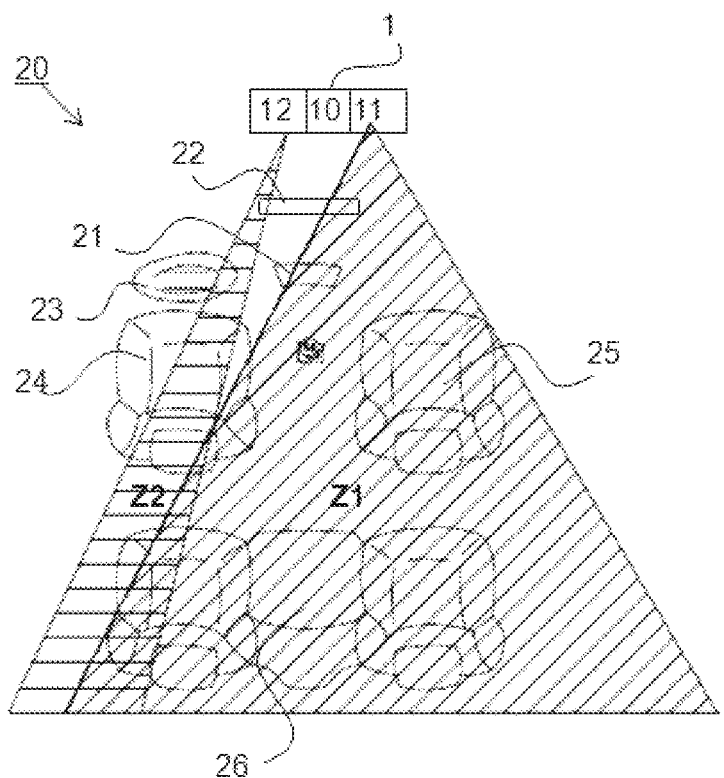

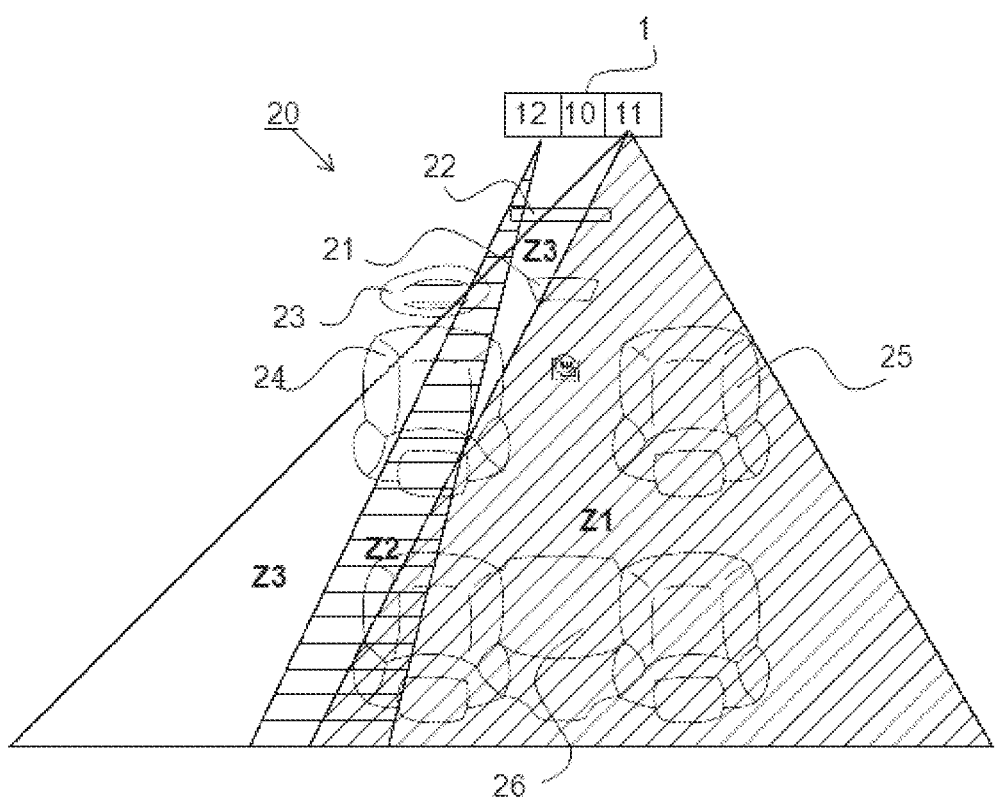
[Fig. 8]

DEVICE FOR OBSERVING A PASSENGER COMPARTMENT OF A VEHICLE

The present invention relates to a device for observing a passenger compartment of a vehicle. It is particularly applicable, but not limited, to motor vehicles.

A device for observing a passenger compartment of a vehicle that comprises a camera, a primary luminous module and a secondary luminous module is known to those skilled in the art. The camera is configured to acquire images of said passenger compartment of the vehicle. Specification Motor-vehicle manufacturers would like to be able to monitor the front passenger and driver of the vehicle. To this end, the camera has a defined field of view of 110 degrees and the primary luminous module and the secondary luminous module each have an illumination field that is also of 110 degrees. This is what is called a large illumination field. By virtue of their large illumination field, the two luminous modules are able to simultaneously illuminate the areas in which the front passenger and the driver of the vehicle are located, so that the camera may acquire images of said passenger and said driver when they are present in said passenger compartment. The images acquired by the camera are sent to an electronic control unit, which performs functions allowing the front passenger and the driver of the vehicle to be monitored and automatically performs certain comfort or safety functions depending on the movement of their body (arms, hands), on the movement of their head, on the state of their eyes, on the type of occupant detected, etc.

To see the direction of her or his gaze or the state of her or his eyes, the driver's pupils must be satisfactorily illuminated. With a large illumination field, there is not enough light illuminating the driver's eyes for the quality of images acquired by the camera to be high enough to verify the direction of the driver's gaze. Specifically, with a large illumination field, the light emitted by the luminous modules is dispersed and little light reaches the eyes of the occupants of the vehicle including the driver. To compensate for this lack of light, the exposure time of the camera, and therefore the time for which the two luminous modules are turned on, which time is thus matched to the exposure time of the camera, namely to the time taken by the camera to acquire the images of the occupants of the vehicle, is increased.

A drawback of this prior art is that increasing the exposure time of the camera and keeping the two luminous modules turned on for longer consumes a great deal of electrical power.

In this context, the present invention aims to provide a device for observing a passenger compartment of a vehicle that allows the aforementioned drawback to be solved.

To this end, the invention provides a device for observing a passenger compartment of a vehicle, said observing device comprising a camera configured to acquire images of said passenger compartment, a primary luminous module and a secondary luminous module, characterized in that the primary luminous module has a primary illumination field configured to illuminate at least one passenger area, and the secondary luminous module has a secondary illumination field narrower than the primary illumination field of said primary luminous module and configured to illuminate a primary driver area of said vehicle.

The observing device according to the invention thus makes it possible to better illuminate a specific part of an occupant of the vehicle, for example the face of the driver of the vehicle, with the secondary luminous module, the secondary illumination field of which is smaller than the illumination field of the primary luminous module, while also illuminating with the primary luminous module the occupants more in their entirety, these occupants in particular including the front passenger of the vehicle.

According to non-limiting embodiments, said observing device may furthermore comprise one or more of the following additional features, implemented alone or in any technically possible combination.

According to one non-limiting embodiment, said primary illumination field is a large illumination field.

According to one non-limiting embodiment, said primary illumination field is comprised between 100 degrees and 160 degrees.

According to one non-limiting embodiment, said secondary illumination field is a small illumination field.

According to one non-limiting embodiment, said secondary illumination field is comprised between 30 degrees and 60 degrees.

According to one non-limiting embodiment, said passenger area corresponds to a front passenger seat.

According to one non-limiting embodiment, said passenger area corresponds to a front passenger seat and to the rear passenger seats.

According to one non-limiting embodiment, said primary illumination field is further configured to illuminate a secondary driver area.

According to one non-limiting embodiment, said primary driver area corresponds to a location of a specific part of a driver of said vehicle.

According to one non-limiting embodiment, said specific part is the face or head of the driver.

According to one non-limiting embodiment, said camera has a field of view and said passenger area and said primary driver area are located within said field of view.

According to one non-limiting embodiment, said primary illumination field and said secondary illumination field are oriented in two different directions.

According to one non-limiting embodiment, said secondary illumination field comprises an optical axis that is orientable at an angle with respect to an optical axis of said camera.

According to one non-limiting embodiment, said primary luminous module and said secondary luminous module are side-by-side.

According to one non-limiting embodiment, said camera is an infrared or near-infrared camera and said primary luminous module and said secondary luminous module are infrared or near-infrared luminous modules.

According to one non-limiting embodiment, said camera is placed between said primary luminous module and said secondary luminous module.

According to one non-limiting embodiment, said secondary driver area corresponds to a driver's seat.

In one non-limiting embodiment, said primary driver area corresponds to a specific location in the vicinity of the driver's seat.

According to one non-limiting embodiment, said camera, said primary luminous module and said secondary luminous module are placed on different electronic carriers.

According to one non-limiting embodiment, said camera, said primary luminous module and said secondary luminous module are placed on the same electronic carrier.

The invention and the various applications thereof will be better understood on reading the following description and on studying the accompanying figures, in which:

FIG. 1 is a schematic of a device for observing a passenger compartment of a vehicle, said observing device comprising a camera, a primary luminous module, and a secondary luminous module, according to one non-limiting embodiment of the invention, FIG. 2 is a schematic of the observing device of FIG. 1, said primary luminous module having a primary illumination field and said secondary luminous module having a secondary illumination field, said fields being oriented according to a first non-limiting embodiment, FIG. 3 is a schematic of the observing device of FIG. 1, said primary luminous module having a primary illumination field and said secondary luminous module having a secondary illumination field, said fields being oriented according to a first variant of a second non-limiting embodiment, FIG. 4 is a schematic of the observing device of FIG. 1, said primary luminous module having a primary illumination field and said secondary luminous module having a secondary illumination field, said fields being oriented according to a second variant of a second non-limiting embodiment, FIG. 5 is a schematic of the observing device of FIG. 1, said camera, said primary luminous module and said secondary luminous module being placed, with respect to each other, according to a first non-limiting embodiment, FIG. 6 is a schematic of the observing device of FIG. 1, said camera, said primary luminous module and said secondary luminous module being placed, with respect to each other, according to a second non-limiting embodiment, FIG. 7 is a schematic view from above of a vehicle passenger compartment with areas illuminated by illumination fields of the primary luminous module and of the secondary luminous module of the observing device of FIG. 1, according to one non-limiting embodiment, FIG. 8 is a schematic view from above of a vehicle passenger compartment with areas illuminated by illumination fields of the primary luminous module and of the secondary luminous module of the observing device of FIG. 1, according to another non-limiting embodiment.

Elements that are identical in terms of structure or function and that appear in various figures have been designated using the same reference signs, unless otherwise indicated.

The device 1 for observing a passenger compartment 20 of a vehicle 2 according to the invention is described with reference to FIGS. 1 to 8 according to non-limiting embodiments. In one non-limiting embodiment, the vehicle 2 is a motor vehicle. The term motor vehicle is understood to mean any type of motorized vehicle. This embodiment will be considered, by way of non-limiting example, in the remainder of the description. Throughout the remainder of the description, the vehicle 2 is thus also called the motor vehicle 2. The motor vehicle 2 comprises a passenger compartment 20, illustrated in FIG. 1 and FIGS. 7 and 8. FIGS. 7 and 8 also illustrate a central console 21, a central rear-view mirror 22, a steering wheel 23, the driver's seat 24, the front passenger seat 25 and the rear passenger seats 26. It will be noted that the rear passenger seats 26 may be replaced by a rear bench seat 26.

As shown in FIG. 1, the observing device 1 comprises:
at least one camera 10,
at least one primary luminous module 11, and
at least one secondary luminous module 12.

In one non-limiting embodiment illustrated in the figures, the observing device 1 comprises a single camera 10, a single primary luminous module 11 and a single secondary luminous module 12. This non-limiting embodiment will be considered, by way of non-limiting example, in the remainder of the description.

The observing device 1 is configured to interact with an electronic control unit 4 configured to analyse the images I acquired by the camera 10 and to perform monitoring functions f1 allowing the occupants o of the motor vehicle 2 to be monitored.

Thus, examples of monitoring functions f1 are:
monitoring indicators of an alertness level of a driver o1,
monitoring for the presence of a passenger o2 in the front,
monitoring for the presence of a passenger or passengers o2 in the rear,
monitoring the type of passenger or passengers o2 in the front and/or rear,
monitoring movements of the arms/hands, of the body of one or more passengers o2,
monitoring the movements of the arms/hands, of the body of the driver o1.

In non-limiting embodiments, the indicators of alertness level comprise at least one among the following: the direction of the gaze of the driver, an open or closed state of the driver's eyes, a frequency at which the driver blinks her or his eyes, a frequency at which the driver yawns.

Following the results of the monitoring functions f1, in one non-limiting embodiment, the electronic control unit 4 is configured to perform comfort functions f2 and/or safety functions f2' to preserve the safety of the occupants o of said motor vehicle 2. Of course, in another non-limiting embodiment, another electronic control unit may perform these functions.

Non-limiting examples of comfort functions f2 and safety functions f2' performed automatically following monitoring of the passengers o2 and of the driver o1 are:
deactivating the air bag of passenger o2 if the front passenger o2 is a baby,
controlling a heating and air-conditioning system, a vehicle-audio system, a navigation system, a telephone system,
sending a message to a human-machine interface and/or an alarm signal if the driver o1 begins to fall asleep,
automatically decreasing the speed of the motor vehicle 2 if the driver o1 begins to fall asleep.

Thus, in non-limiting examples, depending on the gesture of an occupant o, the sound volume of the vehicle-audio system is reduced or increased; the volume of the heating and air-conditioning system is reduced or increased.

In one non-limiting embodiment illustrated in FIGS. 2 and 4 to 6, the electronic control unit 4 is independent of the observing device 1. In another non-limiting embodiment illustrated in FIG. 3, the electronic control unit 4 forms part of the observing device 1. In one illustrated non-limiting variant, it forms part of the camera 10. It will be noted that the electronic control unit 4 is not described below, because such an electronic control unit for performing monitoring functions f1, comfort functions f2 and safety functions f2' is known to those skilled in the art.

In one non-limiting embodiment, the observing device 1 further comprises a housing 15 (illustrated in FIG. 1) configured to accommodate the camera 10, the primary luminous module 11, and the secondary luminous module 12. In one non-limiting variant (not illustrated) the housing 15 also accommodates the electronic control unit 4.

The elements of the observing device 1 are described below.

The camera 10 is described below.

The camera 10 is configured to acquire images I of the passenger compartment 20 of the motor vehicle 2, and in particular of the occupants o of the motor vehicle 2.

The camera 10 is configured to transmit the images I thus acquired to the electronic control unit 4.

In one non-limiting embodiment, the camera 10 is configured to acquire 30 images per second. It will be noted that to obtain a good-quality image of an occupant o, and in particular of a specific part of her or his body such as her or his head with her or his face, it is necessary to shine a large amount of light on the occupant o to be illuminated.

The camera 10 is positioned in the passenger compartment 20 of the motor vehicle 2. In non-limiting embodiments, it is placed in the front in the ceiling light, or in the central rear-view mirror 21 (illustrated in FIGS. 7 and 8), or in the central console 22 (illustrated in FIGS. 7 and 8) of the motor vehicle 2. In the illustrated non-limiting example, it is placed in the ceiling light (not illustrated).

The camera 10 has a field of view HFOV with an optical axis AA'. Part of the field of view HFOV is illuminated by the primary luminous module 11 and another part of the field of view HFOV is illuminated by the secondary luminous module 12. The two parts may have a common intersection.

In one non-limiting embodiment, the camera 10 is an infrared or near-infrared camera. This allows images I to be acquired both day and night. It is thus possible to monitor the occupants o both day and night. In non-limiting embodiments, the camera 10 is a 2D or 3D camera.

The camera 10 is placed in the passenger compartment 20 of the motor vehicle 2 so that its field of view HFOV encompasses the occupants o of the motor vehicle 2, namely the front and rear passengers o2 and the driver o1.

The camera 10 has an exposure time t1. In one non-limiting embodiment, the exposure time t1 is 1 millisecond (ms). In one non-limiting embodiment, the camera 10 is activated periodically. In one non-limiting example, the activation period is every 16 milliseconds. Thus, in one non-limiting example, every 16 ms the camera 10 acquires images I for 1 ms.

In a first non-limiting embodiment illustrated in FIGS. 2 to 5, the camera 10 is positioned between the primary luminous module 11 and the secondary luminous module 12.

In a second non-limiting embodiment illustrated in FIG. 6, the camera 10 is positioned beside the primary luminous module 11 or the secondary luminous module 12, the primary luminous module 11 and the secondary luminous module 12 being placed side-by-side. This makes it possible to position the two luminous modules 11 and 12 on the same electronic carrier such as illustrated in FIG. 6. In the illustrated non-limiting example, the camera 10 is positioned beside the secondary luminous module 12.

In a first non-limiting embodiment illustrated in FIGS. 2, 3, 5 and 6, the camera 10 is positioned on an electronic carrier 13 different from that or those of the primary luminous module 11 and of the secondary luminous module 12. In a first non-limiting variant illustrated in FIG. 6, the primary luminous module 11 and the secondary luminous module 12 are on the same electronic carrier 14. In a second non-limiting variant illustrated in FIGS. 2 to 5, the primary luminous module 11 and the secondary luminous module 12 are on different electronic carriers 14. In a first non-limiting variant illustrated in FIG. 2, the electronic carriers 13 and 14 are in the same plane. In a second non-limiting variant illustrated in FIG. 5, the electronic carriers 13 and 14 are in different but parallel planes. In a third non-limiting variant illustrated in FIG. 3, the electronic carriers 13 and 14 are in different and non-parallel planes.

In a second non-limiting embodiment illustrated in FIG. 4, the camera 10 is positioned on the same electronic carrier 13 as the primary luminous module 11 and secondary luminous module 12. This allows only one electronic carrier to be used, instead of two or three.

In one non-limiting embodiment, the camera 10 is activated when there is an occupant o on the driver's seat 24. In another non-limiting embodiment, the camera 10 is activated when the motor vehicle 2 is started.

The primary luminous module 11 and the secondary luminous module 12 will now be described below.

The primary luminous module 11 and the secondary luminous module 12 comprise at least one light source 110, 120, respectively. In one non-limiting embodiment, they comprise only a single light source 110, 120. This non-limiting embodiment will be considered, by way of non-limiting example, in the remainder of the description.

The light source 110 is configured to emit a light beam allowing a primary illumination field HFOI1 to be obtained, this field also being called the illumination field HFOI1 in the remainder of the description. The light source 120 is configured to emit a light beam allowing a secondary illumination field HFOI2 to be obtained, this field also being called the illumination field HFOI2. The primary illumination field HFOI1 thus represents a space illuminated by the primary luminous module 11. The secondary illumination field HFOI2 thus represents a space illuminated by the secondary luminous module 12.

In one non-limiting embodiment, the light source 110 is a semiconductor light source. In one non-limiting embodiment, said semiconductor light source forms part of a light-emitting diode. Light-emitting diode is given to mean any type of light-emitting diode, whether these are, in non-limiting examples, LEDs, OLEDs (organic LEDs), AMOLEDs (active-matrix-organic LEDs), or FOLEDs (flexible OLEDs). The same goes for the light source 120.

The primary luminous module 11 has an optical axis L1 located at the centre of the primary illumination field HFOI1. The secondary luminous module 12 has an optical axis L2 located at the centre of the secondary illumination field HFOI2. The illumination field HFOI1 and the illumination field HFOI2 are distributed in such a way as to form a light cone. In non-limiting embodiments, the light cone is either circular or rectangular.

In one non-limiting embodiment, the primary illumination field HFOI1 and the secondary illumination field HFOI2 cover the field of view HFOV of the camera 10, i.e. they illuminate the space observed by the camera 10, which observed space corresponds to the field of view HFOV of the camera 10.

It will be noted that the illumination field HFOI1 may or may not intersect the illumination field HFOI2.

The primary luminous module 11 and the secondary luminous module 12 are configured to be synchronized with the camera 10, i.e. their activation is synchronized with activation of the camera 10. They thus turn on and emit a light beam when the camera 10 is turned on, namely when it is acquiring images I of the occupants o of the motor vehicle 2.

In one non-limiting embodiment, the primary luminous module 11 and the secondary luminous module 12 are infrared or near-infrared luminous modules. This makes it possible not to cause the occupants of the motor vehicle 2 discomfort glare when they are illuminated by the luminous modules 11, 12. It will be recalled that the human eye is not sensitive in the infrared and near-infrared.

The primary luminous module 11 and the secondary luminous module 12 are configured to illuminate areas of the passenger compartment 20 of the motor vehicle 2 where occupants o sit so that the camera 10 may acquire images I of said occupants o.

In particular, the secondary luminous module 12 makes it possible to better illuminate the face of the driver o1 including her or his eyes and mouth, while the primary luminous module makes it possible to illuminate the whole body (including the limbs, hands and head) of the occupants o of the vehicle.

The secondary illumination field HFOI2 is narrower than the primary illumination field HFOI1.

Because of its larger primary illumination field HFOI1, the primary luminous module 11 is configured to illuminate one or more occupants o that it is not necessary to illuminate very strongly to perform certain monitoring functions f1 allowing these one or more occupants o to be monitored. Thus, the primary illumination field HFOI1 is configured to illuminate at least one passenger area z1 (illustrated by diagonal hatching in FIGS. 7 and 8). The passenger area z1 is located in the field of view HFOV of the camera 10.

Thus, in one non-limiting embodiment, the primary illumination field HFOI1 is a large illumination field, also called a wide illumination field. In one non-limiting variant, the primary illumination field HFOI1 is comprised between 100 degrees and 160 degrees. In one non-limiting embodiment of this variant, the primary illumination field HFOI1 is substantially equal to 110 degrees. It will be noted that a large illumination field HFOI1 leads to a dispersion of the light that results in a lower illumination level, i.e. less light is shone on the occupants o observed by the camera 10.

It will be noted that, to perform the comfort functions f2, it is not necessary to use monitoring functions f1 requiring images I of very high quality.

The images I acquired by the camera 10 are of lower quality when the occupant or occupants o are illuminated by the primary luminous module 11, because they are not illuminated very strongly. This is the case for the driver o1 or passenger o2 in the front or the passenger or passengers o2 in the rear, lower-quality images I of whom are sufficient to monitor the gestures thereof or even the number of occupants o present. Since it is not necessary to focus on the face, it is not necessary to have images I of very high quality.

Thus, in one non-limiting embodiment illustrated in FIG. 2, the primary luminous module 11 is configured to illuminate the driver o1, the front passenger o2 and the rear passenger or passengers o2. In the non-limiting example illustrated in FIG. 2, it may be seen that there is a passenger o2 in the front and a passenger o2 in the rear (who is smaller in size in the illustration). Thus, the illumination field HFOI1 is thus configured to illuminate a passenger area z1 corresponding to a front passenger seat 25 and to the rear passenger seats 26, and a secondary driver area z3 (illustrated un-hatched in FIG. 8). The secondary driver area z3 corresponds to the driver's seat 24. This makes it possible to illuminate the driver as a whole, including her or his body, limbs, hands and head. The secondary driver area z3 is located in the field of view HFOV of the camera 10.

In another non-limiting embodiment illustrated in FIG. 3, the primary luminous module 11 is configured to illuminate the front passenger o2 and the rear passenger or passengers o2. In the non-limiting example illustrated in FIG. 3, it may be seen that there is a passenger o2 in the front and a passenger o2 in the rear (who is smaller in size in the illustration). The illumination field HFOI1 is thus configured to illuminate a passenger area z1 corresponding to a front passenger seat 25 and to the rear passenger seats 26. In this non-limiting embodiment, it does not illuminate a secondary driver area z3.

In another non-limiting embodiment illustrated in FIGS. 4 to 6, the primary luminous module 11 is configured to illuminate only the front passenger o2. The illumination field HFOI1 is thus configured to illuminate a passenger area z1 corresponding to the front passenger seat 25.

In another non-limiting embodiment (not illustrated) the primary luminous module 11 is configured to illuminate the driver o1 and the front passenger o2. The illumination field HFOI1 is thus configured to illuminate a passenger area z1 corresponding to the front passenger seat 25, and a secondary driver area z3 corresponding to the driver's seat 24.

The primary luminous module 11 will be parameterized according to one of these four modes, namely its illumination field HFOI1 will be defined depending on the occupants o to be illuminated.

Because of its secondary illumination field HFOI2 smaller than the primary illumination field HFOI1, the secondary luminous module 12 is for its part configured to illuminate an occupant o that it is necessary to illuminate strongly to perform certain monitoring functions f1 allowing this occupant o to be monitored. It will be noted that to perform the safety functions f2', it is necessary to use monitoring functions f1 requiring images I of very high quality. In one non-limiting embodiment, the occupant o to be illuminated more intensely is the driver o1. In one non-limiting variant, a specific part vs of said driver o1 is to be illuminated. In one non-limiting embodiment of this non-limiting variant, the specific part vs is the face, so as to capture the eyes and mouth of the driver o1. In another non-limiting embodiment of this non-limiting variant, the specific part vs is the head, so as to capture not only the face but also the neck of the driver o1. In the non-limiting examples illustrated in FIGS. 2 to 6, only the face of the driver o1 has been illustrated.

Thus, in one non-limiting embodiment, the secondary illumination field HFOI2 is a small illumination field, also called a narrow illumination field. In one non-limiting variant, said secondary illumination field HFOI2 is comprised between 30 degrees and 60 degrees. In one non-limiting embodiment of this variant, the secondary illumination field HFOI2 is substantially equal to 40 degrees.

The secondary illumination field HFOI2 is thus constricted to the driver o1. Thus, the secondary illumination field HFOI2 is configured to illuminate a primary driver area z2 (illustrated by the horizontal hatching in FIGS. 7 and 8). The primary driver area z2 is located in the field of view HFOV of the camera 10.

In one non-limiting embodiment, the primary driver area z2 corresponds to a specific location in the vicinity of the driver's seat 25. The specific location corresponds to a location of a specific part vs of the driver o1 of the motor vehicle 2. In a first non-limiting variant, the specific location corresponds to a location of her or his face. The specific part vs is therefore the face. In a second non-limiting variant, the specific location corresponds to the head (which therefore includes the face but also the neck) of the driver o1. The specific part vs is therefore the head. Because it is narrow, the secondary illumination field HFOI2 thus delivers a greater amount of light to the driver o1, and in particular to her or his face or head. It will be noted that the primary driver area z2 illuminated by the secondary illumination field HFOI2 is different from the secondary driver area z3 illuminated by the primary illumination field HFOI1.

The images I acquired by the camera 10 are of better quality when the driver o1 is illuminated by the secondary luminous module 12. This makes it possible to obtain quality images I, with a view to monitoring the face or head of the driver to verify the various alertness indicators described above. Thus, in one non-limiting embodiment, the secondary luminous module 12 is configured to illuminate the driver o1, and in particular a specific part vs such as her or his face or head. The illumination field HFOI2 will thus make it possible to illuminate this specific part vs of the driver o1.

By virtue of the secondary luminous module 12, the face or head of the driver o1 is illuminated sufficiently, and hence her or his eyes are always visible:
  at night,
  and during the day, in particular when the driver o1 is wearing sunglasses absorbing a non-negligible amount of the light emitted by the secondary luminous module 12 and strongly reflecting ambient light.

It will be noted that with a large illumination field, the camera 10 would be unable to acquire images I of the face of the driver o1 if the latter was wearing sunglasses during the day because her or his face would not receive enough light in this case. Therefore, it would be impossible to determine the state of her or his eyes and mouth by analysing the I images thus acquired.

In a first non-limiting embodiment illustrated in FIG. 2, the primary illumination field HFOI1 and the secondary illumination field HFOI2 are oriented in two same directions r1, r2. It will be noted that in FIG. 2, the directions r1, r2 coincide with the respective optical axes L1, L2.

In a second non-limiting embodiment illustrated in FIGS. 3 and 4 for example, the primary illumination field HFOI1 and the secondary illumination field HFOI2 are oriented in two different directions r1, r2. It will be noted that in FIGS. 3 to 6, the directions r1, r2 coincide with the respective optical axes L1, L2.

In order to allow its different orientations r1, r2, in a first non-limiting embodiment illustrated in FIG. 3, the primary luminous module 11 and the secondary luminous module 12 are placed on different electronic carriers 14 and one of the electronic carriers 14 is oriented in a direction different from the direction of the other of the electronic carriers 14. They are therefore in different planes and not parallel. As illustrated in FIG. 3, in a first non-limiting variant, the two electronic carriers 14 are placed in such a way that they are not in the same plane or in planes parallel to the electronic carrier 13 of the camera 10. In another non-limiting variant (not illustrated) the electronic carrier 14 of the primary module 11 is in the same plane or in a plane parallel to the plane of the electronic carrier 13, whereas the electronic carrier 14 of the secondary module 12 is not.

In order to allow its different orientations r1, r2, in a second embodiment illustrated in FIG. 4, a laser array and a light diffuser are used to orient the light beam emitted by the primary luminous module 11 in a determined direction r2. In particular, by virtue of this laser array and this light diffuser, it is thus possible to customize the secondary illumination field HFOI2 and to orient the optical axis L2 at an angle β with respect to the optical axis AA' of the camera 10. The optical axis L2 is thus orientable at the angle β. In one non-limiting embodiment, the angle β is comprised between 5 and 30 degrees. In one non-limiting variant, the angle β is comprised between 15 degrees and 20 degrees. In this technique the lasers are VCSELs (VCSEL being the acronym of Vertical-Cavity Surface-Emitting Laser). Since this type of laser is known to those skilled in the art, it will not be described in more detail here. It will be noted that this second non-limiting embodiment is easier to implement than the first non-limiting embodiment, in particular because it is possible to keep the electronic carriers 14 on which the primary luminous module 11 and the secondary luminous module 12 rest, when the electronic carriers 14 are different, aligned in the same plane or in parallel planes. Moreover, when kept in the same plane or in parallel planes they take up less space than when they are in non-parallel planes. Moreover, they may also be kept in the same plane or in a plane parallel to the electronic carrier 13 of the camera 10. It will be noted that, in this second non-limiting embodiment, the illumination field HFOI1 of the primary luminous module 11 retains a direction r1 (and therefore an optical axis L1) parallel to the optical axis AA' of the camera 10.

Of course, the description of the invention is not limited to the embodiments described above and to the field described above. Thus, in another non-limiting embodiment, the observing device 1 comprises at least two cameras 10, and two assemblies each comprising one primary luminous module 11 and one secondary luminous module 12. In this case, in one non-limiting variant, a first camera 10 is installed in the front of the motor vehicle 2 along with a first set of luminous modules 11, 12 to observe the passenger o2 in the front of the motor vehicle 2 and the driver o1; and a second camera 10 is installed in the rear of the motor vehicle 2 along with a second set of luminous modules 11, 12 to observe the passengers o2 in the rear of the motor vehicle 2. In this case, the second camera 10 is installed in the headliner of the vehicle in one non-limiting example. Thus, in another non-limiting embodiment, it is also possible to use the technique involving the laser array and the light diffuser for the illumination field HFOI1 of the primary luminous module 11, to orient it in a direction r1 that is not parallel to the optical axis AA' of the camera 10.

Thus, the described invention in particular has the following advantages:
  it makes it possible to meet the needs of various monitoring functions f1 requiring occupants o to be illuminated with different amounts of light,
  by virtue of the secondary luminous module 12 with its illumination field HFOI2 narrower than that HFOI1 of the primary luminous module 11, it makes it possible to deliver a maximum of light to where the one or more monitoring functions f1 need it most,
  it makes it possible not to leave the luminous modules 11 and 12 turned on for too long. Consequently, it makes it possible to prevent the latter from overheating,
  it avoids increasing the exposure time of the camera 10 and therefore consuming too much electrical power,
  if the driver o1 of the motor vehicle 2 is wearing sunglasses during the day, it prevents the light emitted by the luminous modules 11 and 12 from being drowned out in the sunlight reflected by the sunglasses. Consequently, it makes it possible to acquire images I of the face of the driver o1 that are of good quality, with a view to picking up the state of her or his eyes and the direction of her or his gaze, especially when she or he is wearing sunglasses.

The invention claimed is:

1. A device for observing a passenger compartment of a vehicle, the observing device comprising:
  a camera configured to acquire images of the passenger compartment;
  a primary luminous module; and
  a secondary luminous module,
  wherein the primary luminous module projects a primary illumination field configured to illuminate at least one passenger area, and wherein the secondary luminous module projects a secondary illumination field narrower than the primary illumination field of the primary luminous module and configured to illuminate a primary driver area of the vehicle.

2. The observing device according to claim 1, wherein the primary illumination field is a large illumination field.

3. The observing device according to claim 1, wherein the primary illumination field is comprised between 100 degrees and 160 degrees.

4. The observing device according to claim 1, wherein the secondary illumination field is a small illumination field.

5. The observing device according to claim 4, wherein the secondary illumination field is comprised between 30 degrees and 60 degrees.

6. The observing device according to claim 1, wherein the passenger area corresponds to a front passenger seat.

7. The observing device according to claim 1, wherein the passenger area corresponds to a front passenger seat and to the rear passenger seats.

8. The observing device according to claim 1, wherein the primary illumination field is further configured to illuminate a secondary driver area.

9. The observing device according to claim 1, wherein the primary driver area corresponds to a location of a specific part of a driver of the vehicle.

10. The observing device according to claim 9, wherein the specific part is the face or head of the driver.

11. The observing device according to claim 1, wherein the camera has a field of view and the passenger area and the primary driver area are located within the field of view.

12. The observing device according to claim 1, wherein the primary illumination field and the secondary illumination field are oriented in two different directions.

13. The observing device according to claim 12, wherein the secondary illumination field comprises an optical axis that is orientable at an angle with respect to an optical axis of the camera.

14. The observing device according to claim 1, wherein the primary luminous module and the secondary luminous module are side-by-side.

15. The observing device according to claim 1, wherein the camera is an infrared or near-infrared camera and the primary luminous module and the secondary luminous module are infrared or near-infrared luminous modules.

* * * * *